US008644708B2

(12) United States Patent
Cheng

(10) Patent No.: US 8,644,708 B2
(45) Date of Patent: Feb. 4, 2014

(54) COUPLED SEED LIGHT INJECTION FOR WAVELENGTH DIVISION MULTIPLEXING PASSIVE OPTICAL NETWORKS

(75) Inventor: Ning Cheng, Sunnyvale, CA (US)

(73) Assignee: Futurewei Technologies, Plano, TX (US)

( * ) Notice: Subject to any disclaimer, the term of this patent is extended or adjusted under 35 U.S.C. 154(b) by 508 days.

(21) Appl. No.: 12/901,131

(22) Filed: Oct. 8, 2010

(65) Prior Publication Data

US 2011/0091210 A1   Apr. 21, 2011

Related U.S. Application Data

(60) Provisional application No. 61/253,594, filed on Oct. 21, 2009.

(51) Int. Cl.
*H04J 14/00* (2006.01)
*H04J 14/02* (2006.01)

(52) U.S. Cl.
USPC ............... 398/72; 398/71; 398/79; 398/66

(58) Field of Classification Search
USPC ............... 398/58, 61, 72, 71, 79, 66
See application file for complete search history.

(56) References Cited

U.S. PATENT DOCUMENTS

| 5,729,369 | A * | 3/1998 | Zirngibl | 398/34 |
| 5,815,295 | A * | 9/1998 | Darcie et al. | 398/72 |
| 6,252,689 | B1 * | 6/2001 | Sharp | 398/168 |
| 6,577,422 | B1 * | 6/2003 | Frigo et al. | 398/49 |
| 7,860,393 | B1 * | 12/2010 | Birk et al. | 398/71 |
| 8,086,102 | B2 * | 12/2011 | Kim et al. | 398/67 |
| 8,538,262 | B2 * | 9/2013 | Beckett et al. | 398/63 |
| 2003/0039010 | A1 * | 2/2003 | Akimoto et al. | 359/152 |
| 2004/0213574 | A1 * | 10/2004 | Han et al. | 398/71 |

(Continued)

FOREIGN PATENT DOCUMENTS

| WO | 2007133000 A1 | 11/2007 | |
| WO | WO 2007133000 A1 * | 11/2007 | H04B 10/13 |

(Continued)

OTHER PUBLICATIONS

Foreign communications from a counterpart application, PCT application PCT/US2010/053522, International Search Report dated Feb. 10, 2011, 5 pages.

(Continued)

*Primary Examiner* — Ken Vanderpuye
*Assistant Examiner* — Abbas H Alagheband
(74) *Attorney, Agent, or Firm* — Conely Rose, P.C.; Grant Rodolph

(57) ABSTRACT

An apparatus comprising a first optical transmitter configured to couple to a second optical transmitter, a first optical receiver, and a seed light source, wherein the first optical transmitter and the first optical receiver are part of a first passive optical network (PON) and the second optical transmitter and a second optical receiver are part of a second PON, and wherein at least one of the first optical transmitter and the second optical transmitter is an injection locked laser transmitter. Also disclosed is a method comprising feeding a seed light to a plurality of injection locked laser transmitters in a plurality of PONs using only one broadband light source (BLS), wherein each PON comprises an optical line terminal (OLT) transmitter and a plurality of optical network units (ONUs) transmitters.

16 Claims, 8 Drawing Sheets

(56) References Cited

U.S. PATENT DOCUMENTS

| | | | |
|---|---|---|---|
| 2004/0247320 A1* | 12/2004 | Bickham et al. | 398/71 |
| 2005/0158049 A1* | 7/2005 | Lee et al. | 398/71 |
| 2006/0083515 A1* | 4/2006 | Hann et al. | 398/87 |
| 2006/0093359 A1* | 5/2006 | Lee et al. | 398/70 |
| 2006/0120664 A1* | 6/2006 | Lee et al. | 385/24 |
| 2006/0171629 A1* | 8/2006 | Shin et al. | 385/24 |
| 2007/0274729 A1* | 11/2007 | Lee et al. | 398/153 |
| 2009/0257749 A1* | 10/2009 | Rasztovits-Wiech | 398/63 |
| 2010/0046950 A1* | 2/2010 | Cao et al. | 398/79 |
| 2010/0142954 A1* | 6/2010 | Rossetti et al. | 398/72 |
| 2011/0033187 A1* | 2/2011 | Rossetti et al. | 398/79 |
| 2011/0091214 A1* | 4/2011 | Cheng | 398/91 |
| 2012/0189309 A1* | 7/2012 | Habel et al. | 398/82 |
| 2012/0321316 A1* | 12/2012 | Presi et al. | 398/67 |

FOREIGN PATENT DOCUMENTS

| | | | | |
|---|---|---|---|---|
| WO | 2008019612 A1 | 2/2008 | | |
| WO | WO 2008019612 A1 * | 2/2008 | ............ | H04B 10/13 |
| WO | 2008019612 A1 | 12/2008 | | |
| WO | 2009078572 A1 | 6/2009 | | |
| WO | WO 2009078572 A1 * | 6/2009 | ............ | H04B 10/13 |
| WO | 2009117822 A1 | 10/2009 | | |
| WO | WO 2009117822 A1 * | 10/2009 | ............ | H04B 10/14 |

OTHER PUBLICATIONS

Foreign communications from a counterpart application, PCT application PCT/US2010/053522, Written Opinion dated Feb. 10, 2011, 8 pages.

Z. Xu, Y. J. Wen, W-D. Zhong, T. H. Cheng, X. Cheng, Y. Wang, and Y-K. Yeo, "10-Gb/s Carrier-Reuse WDM-PON Based on Injection Locked FP-LDs," Proc. OECC (Optoelectronics and Communication Conference) 2008.

H. D. Kim, S.-G. Kang, and C.-H. Lee, "A low-cost WDM source with an ASE injected Fabry—Pérot semiconductor laser," IEEE Photonics Technology Letter, vol. 12, No. 8, pp. 1067-1069, Aug. 2000.

W. Lee, M. Y. Park, S. H. Cho, J. Lee, C. Kim, G. Jeong, and B. W. Kim, "Bidirectional WDM-PON Based on Gain-Saturated Reflective Semiconductor Optical Amplifiers," IEEE Photonics Technology Letter, vol. 17, No. 11, pp. 2460-2462, Nov. 2005.

E. Wong, K. L. Lee, and T. B. Anderson, "Directly Modulated Self-Seeding Reflective Semiconductor Optical Amplifiers as Colorless Transmitters in Wavelength Division Multiplexed Passive Optical Networks," IEEE Journal of Lightwave Technology, vol. 25, No. 1, pp. 67-74, 2007.

* cited by examiner

COUPLED SEED LIGHT INJECTION FOR WAVELENGTH DIVISION MULTIPLEXING PASSIVE OPTICAL NETWORKS

CROSS-REFERENCE TO RELATED APPLICATIONS

The present application claims priority to U.S. Provisional Patent Application No. 61/253,594 filed Oct. 21, 2009 by Ning Cheng and entitled "Coupled Seed Light Injection for WDM PONs," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over "the last mile." The PON is a point to multi-point network comprised of an optical line terminal (OLT) at a central office, an optical distribution network (ODN), and a plurality of optical network units (ONUs) at the customer premises. Downstream data transmissions may be broadcast to all of the ONUs, while upstream data transmissions may be transmitted to the OLT using various multiple access techniques, such as time division multiple access (TDMA), wavelength division multiple access (WDMA), and frequency division multiple access (FDMA). These multiple access technologies ensure transmissions from the ONUs are received by the OLT without conflicting with one another. The per-user capacity of TDMA-based PONs is inversely proportional to the number of ONUs, partially because the time between one ONU completing its transmission and the next ONU starting transmission, known as the turnaround time, may only allow the transmission speed to scale up to a certain point without any data loss. As such, next generation PONs are likely to implement WDMA technology to achieve increased throughput.

WDMA systems use multiple light wavelengths to carry multiple data signals. Each of the wavelengths may be assigned to one of the ONUs, which allows for a point-to-point communications path from each ONU to the OLT. The multiple wavelength carrier signals are multiplexed onto an optical fiber before reaching the OLT. The components of a WDMA-based PON or wavelength division multiplexing PON (WPON) system may be more complex and/or have a higher cost than other PON system components, in part because WPONs use high-precision lasers, optical amplifiers, optical filters, and/or optical splitters. Reducing overall system complexity and/or cost is important for implementing WPON systems.

SUMMARY

In one embodiment, the disclosure includes an apparatus comprising a first optical transmitter configured to couple to a second optical transmitter, a first optical receiver, and a seed light source, wherein the first optical transmitter and the first optical receiver are part of a first PON and the second optical transmitter and a second optical receiver are part of a second PON, and wherein at least one of the first optical transmitter and the second optical transmitter is an injection locked laser transmitter.

In another embodiment, the disclosure includes an apparatus comprising a seed light source, a first PON coupled to the seed light source, wherein the first PON comprises a first OLT transmitter and a plurality of first ONU transmitters, and a second PON coupled to the seed light source via the first PON, but not coupled to any other seed light sources, wherein the second PON comprises a second OLT transmitter and a plurality of second ONU transmitters.

In yet another embodiment, the disclosure includes a method comprising feeding a seed light to a plurality of injection locked laser transmitters in a plurality of PONs using only one broadband light source (BLS), wherein each PON comprises an OLT transmitter and a plurality of ONUs transmitters.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
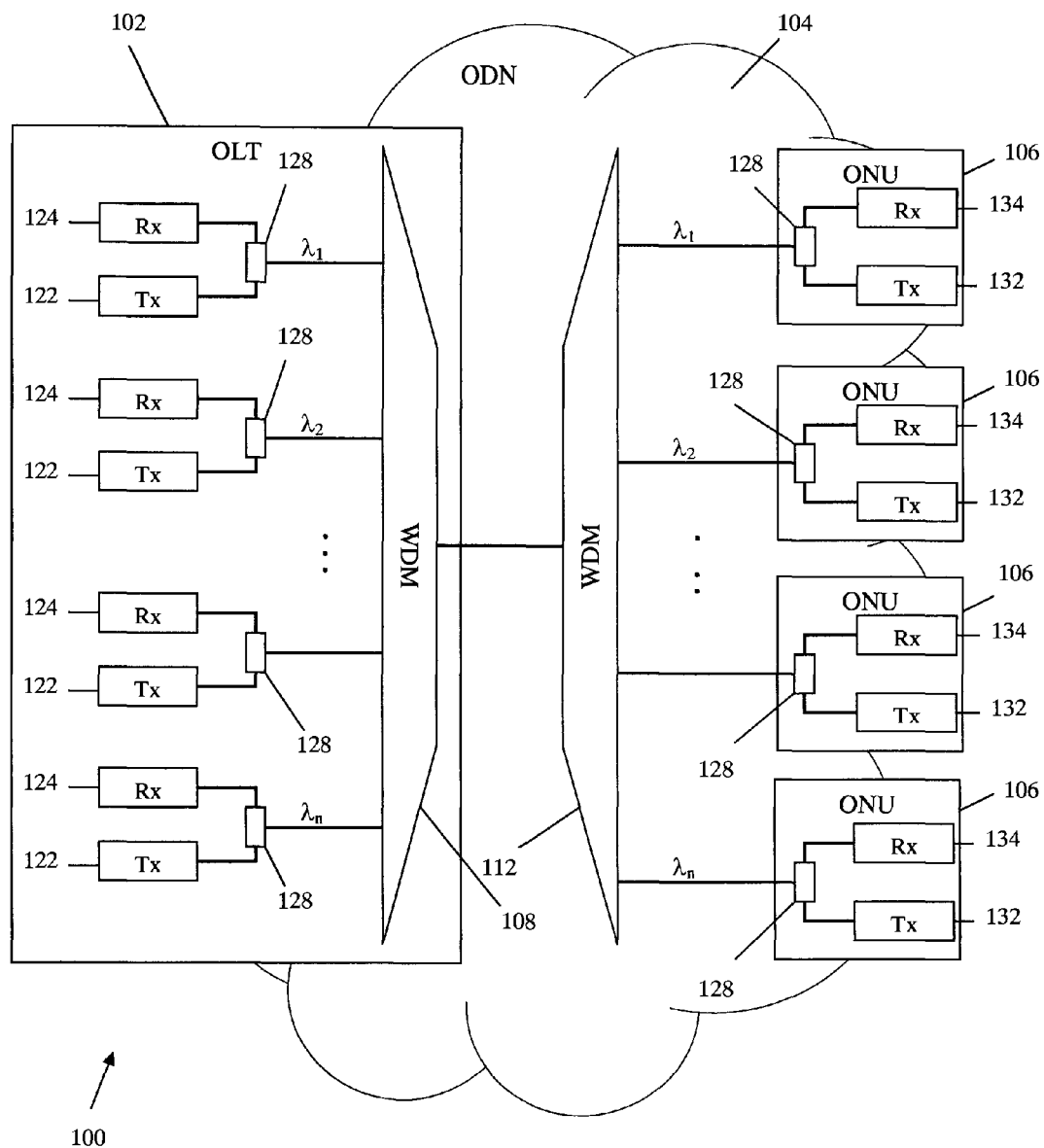
FIG. 1 is a schematic diagram of one embodiment of a PON architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Wavelength-specific laser transmitters are part of the PON system and may contribute significantly to the overall cost of the system. Further, each laser transmitter needs to be precisely aligned with substantially high precision to emit its wavelength within an assigned passband of an optical filter, e.g. an arrayed wave guide (AWG) filter. In some systems, a plurality of fixed wavelength laser sources that have well-defined transmission wavelengths may be used, such as distributed feedback (DFB) lasers. The output wavelengths of such laser sources may not drift greatly due to environmental variations, such as temperature changes. However, the fixed wavelength lasers may require service providers to maintain an inventory of extra specific-wavelength lasers, e.g. lasers that correspond to the optical channels of the PON. Maintaining and storing the extra lasers may cause logistical problems and increase cost. Alternatively, PONs may implement colorless laser transmitters that are capable of transmitting light at variable wavelengths, such as tunable colorless lasers and seed light injected lasers. Tunable colorless lasers, e.g. lasers having a relatively wide tuning spectrum, may require stringent temperature control and may have a relatively high cost. Seed light injected lasers, such as injection locked Fabry-Perot laser diodes (IL FP LDs), semiconductor optical amplifiers (SOAs), reflective semiconductor optical amplifiers (RSOAs), reflective optical amplifiers (ROAs), reflective electro-absorption modulators (REAMs), and other types of seed light injected lasers may be relatively less expensive than other laser sources and may typically have adequate transmission characteristics for implementation in PONs. However, seed light injected lasers may need BLSs to operate. The BLSs are used to generate the "seed light" to provide injection-locking for the lasers and may substantially add to system cost.

Disclosed herein are systems and methods to provide a shared BLS for a plurality of seed light injected lasers to reduce complexity and/or cost for PONs. The systems provide a plurality of coupled/chained seed light injected lasers in a plurality of PONs that share one or more BLSs, which may reduce the number of BLSs in the PONs. The shared BLS configuration may also improve power usage by reducing per-component power consumption. The BLS may emit a broadband light (e.g. white light) signal, for instance in a continuous wavelength (CW) form. The broadband light signal may comprise a plurality of the optical wavelengths within a certain spectral range. The broadband light signal may be filtered using an AWG (e.g. for each PON) to generate a plurality of narrowband/single-wavelength light signals that correspond to a plurality of PON wavelength channels and are used as seed light sources for the corresponding seed light injected lasers. Each of the seed light signals may be injected into a seed light injected laser transmitter to transmit a narrowband/single wavelength channel based on an optical process known as injection-locking. Injection-locking may generate substantially coherent light that is suitable for optical transmissions from a less-coherent/non-coherent light source at about the same wavelength, which may not be suitable to carry signals. Additionally, a portion (e.g. about 10 percent energy) of the light output from the seed light injected lasers in at least one of the PONs may be tapped-off and directed to another PON to provide seed light signals in the other PON. Alternatively, a portion of the light-output from the seed light injected lasers in one of the PONs may be distributed to a plurality of other PONs. This shared BLS configuration may be applied to provide a plurality of downstream wavelength channels and/or a plurality of upstream wavelength channels in a plurality of PONs.

FIG. 1 illustrates one embodiment of a PON 100. The PON 100 may include an OLT 102, an ODN 104, and a plurality of ONUs 106. The PON 100 may be a communications network that does not require any active components to distribute data between the OLT 102 and the ONUs 106. Instead, the PON 100 may use the passive optical components in the ODN 104 to distribute data between the OLT 102 and the ONUs 106. Examples of suitable PONs 100 may include the asynchronous transfer mode PON (APON) and the broadband PON (BPON) defined by the International Telecommunications Union (ITU) Telecommunications Standardization Sector (ITU-T) G.983 standard, the Gigabit PON (GPON) defined by the ITU-T G.984 standard, the Ethernet PON (EPON) defined by the Institute of Electrical and Electronics Engineers (IEEE) 802.3ah standard, and 10 Gigabit EPON (10G-EPON) defined by the IEEE 802.3av standard, and the WPON, all of which are incorporated herein by reference as if reproduced in their entirety.

The OLT 102 may be one component of the PON 100. The OLT may comprise a plurality of OLT transmitters 122, a plurality of OLT receivers 124, an OLT wavelength division multiplexer (WDM) 108, and a plurality of optical diplexers 128 that couple the OLT transmitters 122 to the OLT receivers 124 as shown in FIG. 1. In an embodiment, the OLT 102 may be any device that is configured to communicate with the ONUs 106 and another network (not shown). The OLT 102 may act as an intermediary between the other network and the ONUs 106 in that the OLT 102 forwards data received from the network to the ONUs 106, and forwards data received from the ONUs 106 onto the other network. If the other network is a non-optical network that uses a different protocol than that of the PON 100, such as Ethernet or synchronous optical networking (SONET)/synchronous digital hierarchy (SDH), then the OLT 102 may also comprise a converter that converts the other network's data into the PON's protocol, and converts the PON's data into the other network's protocol. The OLT 102 may be located at a central location, such as a central office, or may be located at other locations as well.

The OLT transmitters 122 may comprise a plurality of devices capable of transmitting optical signals to the ONUs 106, e.g. laser transmitters. In an embodiment, the OLT transmitters 122 may comprise seed light injected lasers, e.g. IL FP LDs, SOAs, RSOAs, ROAs, and/or REAMs. Seed light injected lasers may be capable of locking their wavelength to an incoming seed light wavelength based on the injection-locking mechanism, e.g. to transmit relatively high efficiency light from a lower efficiency light source of the same wavelength. As such, the OLT transmitters 122 may transmit a plurality of downstream optical channels that comprise single wavelengths or narrowband wavelength channels to different ONUs 106. The transmitted wavelengths from the OLT transmitters 122 may be modulated, e.g. individually or collectively, and distributed downstream to the ONUs 106.

The OLT receivers 124 may comprise any devices capable of receiving an optical signal from the ONUs 106, such as photo-detectors or photodiodes. The OLT receivers 124 may receive a plurality of upstream optical channels from a plurality of ONUs 106. The upstream optical signals may comprise single wavelengths or narrowband wavelength channels that match the wavelengths of the corresponding (paired) OLT transmitters 122.

The OLT WDM 108 may be any device capable of filtering optical signals, such as an AWG. The OLT WDM 108 may be configured to separate the upstream optical signals transmitted from the corresponding ONUs 106 and distribute the upstream optical signals to the corresponding OLT receivers 124 via the optical diplexers 128. Additionally, the OLT WDM 108 may receive a plurality of downstream optical signals from the OLT transmitters 122 and combine the corresponding optical signals into a single fiber, which may forward the optical signals to the ONUs 106. Additionally, the OLT WDM 108 may be configured to direct seed light signals from a BLS or a neighboring PON to the OLT transmitters 122 and/or ONU transmitters 132, as described below, to provide injection-locking to the seed light injected lasers in the OLT transmitters 122 and/or the ONU transmitters 132. The seed light signals may match the wavelengths of the OLT transmitters 122 and/or the ONU transmitters 132.

The optical diplexers 128 may be any devices capable of filtering optical signals. Specifically, each of the optical diplexers 128 may separate a downstream optical signal and a corresponding upstream optical channel, which may each have their own or share a common wavelength or a narrowband of wavelengths. The optical diplexers 128 may direct the downstream optical channel from an OLT transmitter 122 to the OLT WDM 108 and the upstream optical channel from the OLT WDM 108 to the OLT receiver 124. Additionally, the optical diplexers 128 may be configured to direct upstream seed light signals from the OLT WDM 108 to the OLT transmitter 122 to provide the injection-locking if needed to operate the lasers.

Another component of the PON 100 may be the ODN 104. The ODN 104 may be a data distribution system comprised of optical fiber cables, splitters, distributors, and/or other equipment that may be used to properly direct the downstream optical channels from the OLT 102 to the ONUs 106 and the upstream optical channels from the ONUs 106 to the OLT 102. The components of the ODN 104 may be passive optical components. In some embodiments, the ODN 104 may also comprise active optical components that require power to operate. The ODN 104 typically extends from the OLT 102 to the ONUs 106 in a branching configuration as shown in FIG. 1, but may be configured in any other suitable configuration or architecture. The ODN 104 may comprise an ODN WDM 112, which may be configured substantially similar to the OLT WDM 108. Accordingly, the ODN WDM 112 may receive the combined downstream optical channels from the OLT 102 and distribute the channels to the corresponding ONUs 106. The ODN WDM 112 may also combine the upstream optical channels from the corresponding ONUs 106 and forward the channels to the OLT 102.

The ONUs 106 may be another component of the PON 100. Each ONU 106 may comprise an ONU receiver 134 and an ONU transmitter 132, which may be coupled by an optical diplexer 128. The ONUs 106 may be any device configured to communicate with the OLT 102 and a customer or user (not shown). Specifically, the ONUs 106 may act as an intermediary between the OLT 102 and the customers in that the ONUs 106 forward data received from the OLT 102 to the customers and forward data received from the customers to the OLT 102. In some embodiments, ONUs 106 and optical network terminals (ONTs) are similar, and thus the terms are used interchangeably herein. The ONUs 106 are typically located at distributed locations, such as the customer premises, but may be located at other locations as well.

The ONU receivers 134 may be any device capable of receiving an optical signal from the OLT 102. Specifically, each ONU receiver 134 may be configured to receive a corresponding downstream optical signal from a corresponding OLT transmitter 122 at a corresponding wavelength or narrowband wavelength channel. The ONU receivers 134 may receive different wavelengths, e.g. $\lambda_1, \lambda_2, \ldots \lambda_n$ (n is an integer), from the corresponding OLT transmitters. In an embodiment, the ONU receivers 134 may be configured substantially similarly to the OLT receivers 124.

The ONU transmitters 132 may be any device capable of transmitting optical signals to the OLT 102. Specifically, each ONU transmitter 132 may be configured to transmit a corresponding upstream optical signal to a corresponding OLT receiver 124 at a corresponding wavelength or narrowband wavelength channel. The ONU transmitters 132 may transmit different wavelengths to the corresponding OLT receivers 124. In some embodiments, the ONU transmitters 132 may be configured substantially similarly to the OLT transmitters 122. Further, similar to the OLT transmitters 122, the ONU transmitters 132 may operate using a plurality of corresponding seed light signals (e.g. from a BLS) based on injection-locking. For instance, the ONU transmitters 132 may comprise seed light injected lasers such as IL FP LDs, SOAs, RSOAs, ROAs, REAMs, or combinations thereof.

The optical diplexers 128 in the ONUs 106 may be configured substantially similar to the optical diplexers 128 in the OLT 102. As such, the optical diplexers 128 may separate a downstream optical channel and a corresponding upstream optical channel in each ONU 106. The optical diplexers 128 may also direct the seed light signals to the corresponding ONU transmitters 132.

Figure 2:
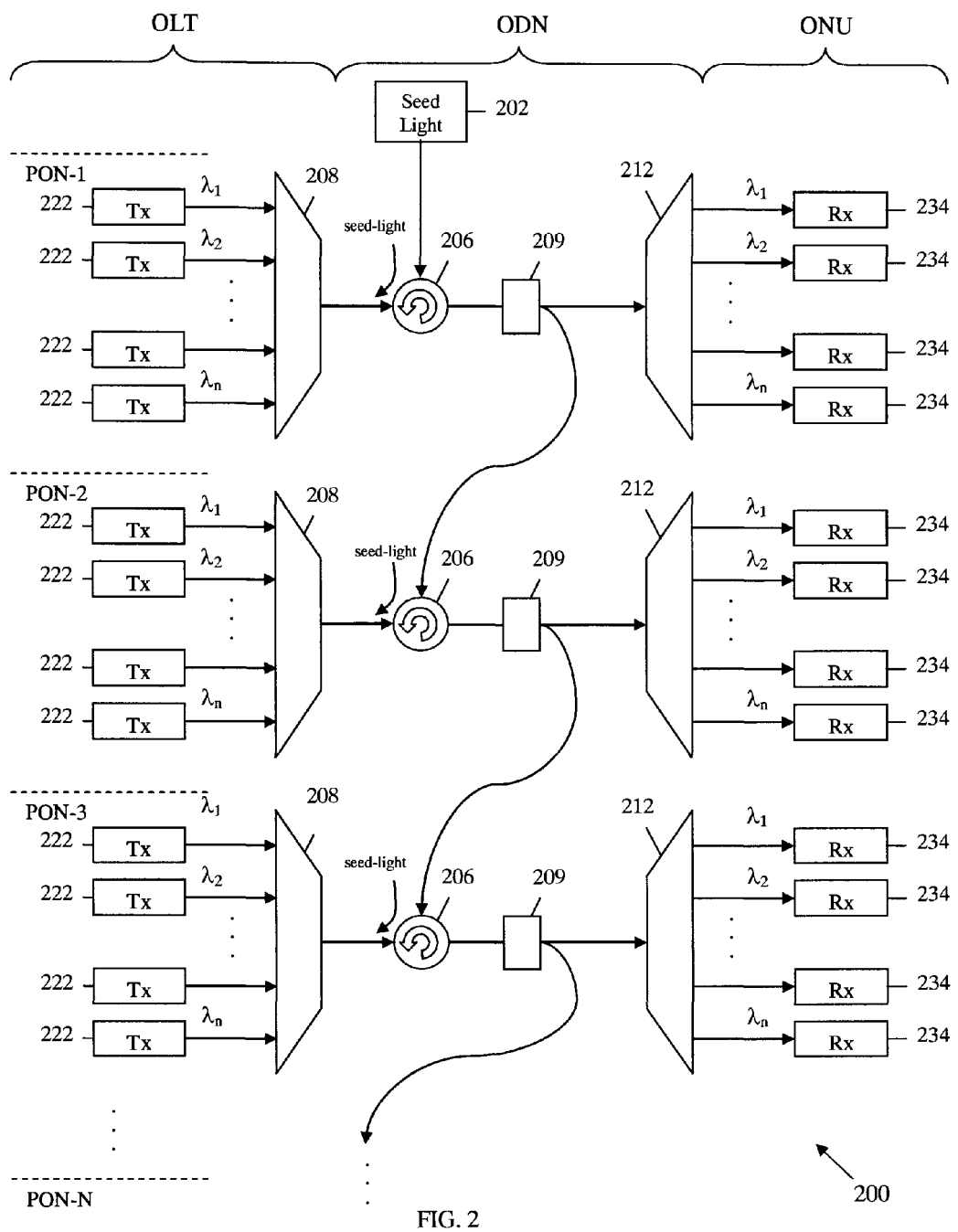
FIG. 2 is a schematic diagram of another embodiment of a PON architecture.

In an embodiment, a plurality of PONs, which may be configured substantially similar to the PON 100, may be coupled to one another in a PON architecture to share a BLS, e.g. to reduce the number of BLSs. As such, the BLS may provide a plurality of seed light signals to a plurality of OLT transmitters in the different PONs, such as the OLT transmitters 122 and/or ONU transmitters 132. FIG. 2 illustrates an embodiment of a PON architecture 200 that may be used to enable a plurality of PONs, e.g. PON-1, PON-2, . . . PON-N (N is an integer), to share a BLS. Specifically, the same BLS may be used to support injection-locking to transmit a plurality of downstream optical channels in the different PONs. The downstream optical channels are indicated by the arrows that point from left to right in FIG. 2. For each PON, the PON architecture 200 may comprise a plurality of OLT transmitters 222, an OLT WDM 208, an optical circulator 206, an optical splitter 209, an ODN WDM 212, and a plurality of ONU receivers 234. Additionally, the PON architecture 200 may comprise a seed light source 202 that may be coupled to one of the PONs. The components of the PON architecture 200 may be arranged as shown in FIG. 2 and may be configured substantially similar to the corresponding components of the PON 100. The seed light source 202, the OLT WDM 208, the optical circulators 206, the optical splitters 209, the ODN WDM 212, or combinations thereof may be located in the ODNs or OLTs of the corresponding PONs.

The seed light source 202 may comprise a BLS, e.g. an Erbium-doped optical fiber amplifier (EDFA), a super-luminescent light-emitting diodes (SLED), or any other light source capable of emitting broadband light (e.g. white light) at about constant energy. The optical circulators 206 may be any passive optical device that comprises multiple input/output ports and is capable of receiving an optical signal, e.g. via a first port, and forwarding the optical signal, e.g. via a second port. In an embodiment, the optical circulator 206 may comprise about three ports and may be configured to route a first optical signal received on a first port to a second port, a second optical signal received on the second port to a third port, and a third optical signal received on the third port to the first port. The first port, second port, and third port may be ordered in the clockwise direction, in the counter-clockwise direction, or in any suitable alternative configuration.

The seed light source 202 may be configured to transmit a broadband light signal to a first optical circulator 206 in a first PON (e.g. PON-1), as shown in FIG. 2. The first optical circulator 206 may direct the broadband light signal upstream to the OLT WDM 208 of the first PON. The OLT WDM 208 may then filter the broadband light signal into a plurality of single wavelength signals or narrowband wavelength signals, and/or seed light signals (e.g. $\lambda_1, \lambda_2, \ldots \lambda_n$) and distribute the signals to a plurality of OLT transmitters 222 of the same PON. The single wavelength signals or narrowband wavelength signals may correspond to seed light signals for the OLT transmitters 222 that provide injection-locking. The terms "single wavelength signals," "narrowband wavelength signals," and "seed light signals" may be used interchangeably herein to designate light signals that provide injection-locking to seed light injected lasers in any of the PON configurations. As such, the OLT transmitters 222, e.g. seed light injected lasers, may use the seed light signals from the OLT WDM 208 to transmit the downstream optical channels at the corresponding wavelengths, e.g. $\lambda_1, \lambda_2, \ldots \lambda_n$. The OLT transmitters 222 may transmit the downstream optical channels via the OLT WDM 208 and the optical circulator 206 to an optical splitter 209 in the same PON.

The optical splitter 209 may direct a first portion of the combined downstream optical channels to a corresponding ODN WDM 212 and a second portion of the combined downstream optical channel to a second optical circulator 206 in a second PON, e.g. PON-2. Specifically, the optical splitter 209 may direct a first portion of the energy (e.g. about 90 percent) of each of the downstream optical channels, e.g. that correspond to $\lambda_1, \lambda_2, \ldots \lambda_n$, to a plurality of ONU receivers 234 via the ODN WDM 212 in the first PON, and direct a second portion of the energy (e.g. about 10 percent) of each of the downstream optical channels to the second optical circulator 206 in the second PON. The light signals directed from a first PON to a second PON are indicated by an arrow from a first optical splitter 209 to a second optical splitter 209 circulator 206 in FIG. 2.

Thus, each of the ONU receivers 234 in the first PON may receive a corresponding downstream optical channel at a corresponding wavelength via the ODN WDM 212. The second portion of the combined downstream optical channels or signals may provide a broadband light signal to the second PON, e.g. similar to the output from a BLS, and may be handled by the components of the second PON to provide seed light signals to the OLT transmitters 222 of the second PON in a manner similar to the corresponding component of the first PON. The process of splitting and directing a portion of the downstream optical signals in the first PON to the second PON, e.g. using an optical splitter 209 and an optical circulator 206 coupled to the optical splitter 209, may be repeated for a plurality PONs (e.g. PON-3, . . . PON-N) to share the same seed light source 202 or BLS and reduce the number of PON components.

Figure 3:
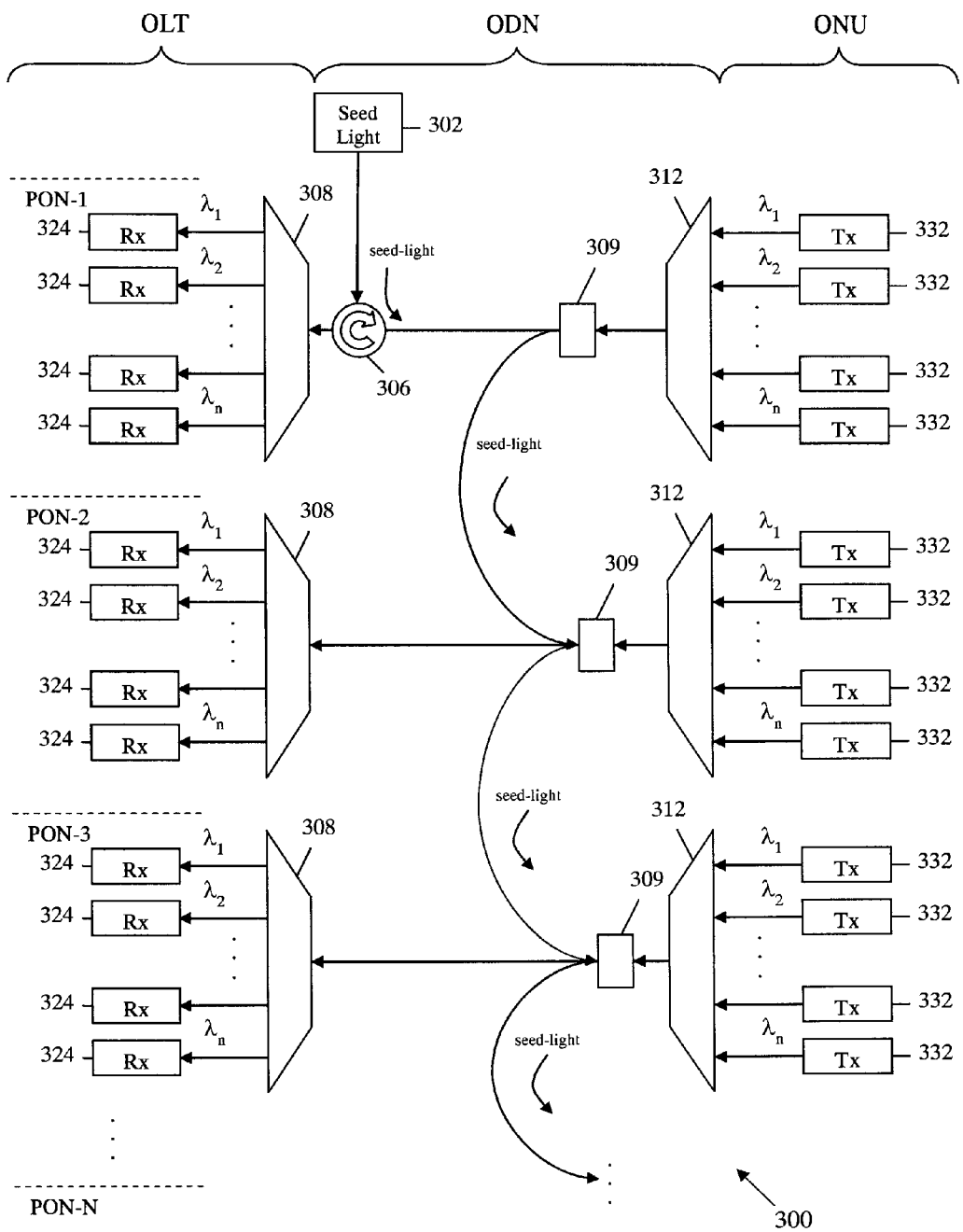
FIG. 3 is a schematic diagram of another embodiment of a PON architecture.

FIG. 3 illustrates another embodiment of a PON architecture 300 that may be used to enable a plurality of PONs, e.g. PON-1, PON-2, . . . PON-N, to share a seed light source 302 to support injection-locking to transmit a plurality of upstream optical signals in the different PONs. The upstream optical channels are indicated by the arrows that point from right to left in FIG. 3. The PON architecture 300 may comprise a plurality of OLT receivers 324, an OLT WDM 308, an optical splitter 309, an ODN WDM 312, and a plurality of ONU transmitters 332 for each of the PONs. Additionally, the PON architecture 300 may comprise a seed light source 302 and an optical circulator 306, both of which may be coupled to one of the PONs. The components of the PON architecture 300 may be arranged as shown in FIG. 3 and may be configured substantially similar to the corresponding components of PON architecture 200.

The seed light source 302 may be configured to transmit a broadband light signal to the optical circulator 306 in a first PON, e.g. PON-1. The optical circulator 306 may direct the broadband light signal to the ONU transmitters 332 in the same PON, via the optical splitter 309. The optical splitter 309 may be configured to allow the broadband light signal to pass from the optical circulator 306 to the ODN WDM 312. The ODN WDM 312 may then filter the broadband light signal into a plurality of seed light signals that correspond to a plurality of wavelengths, e.g. $\lambda_1, \lambda_2, \ldots \lambda_n$, and distribute the signals to the ONU transmitters 332 that are coupled to the ODN WDM 312. As such, the ONU transmitters 332, which may be seed light injected lasers, may use the seed light signals to transmit a plurality of upstream optical channels at the corresponding wavelengths to the OLT WDM 308, via the ODN WDM 312, the optical splitter 309, and the optical circulator 306. Thus, each of the OLT receivers 324 may receive a corresponding upstream optical channel at a corresponding wavelength via the OLT WDM 308. The seed light source 302, the OLT WDM 308, the optical circulators 306, the optical splitters 309, the ODN WDM 312, or combinations thereof may be located in the ODNs or OLTs of the corresponding PONs, and need not be the same for all PONs.

When the optical splitter 309 receives the upstream optical channel from the ONU transmitters 332, the optical splitter 309 may direct a first portion of the combined optical channels (e.g. about 90 percent energy in each channel) to the OLT WDM 308, and a second portion of the upstream optical channels (e.g. about 10 percent energy in each channel) to a second optical splitter 309 in a second PON (e.g. PON-2) that is coupled to the first PON. The second optical splitter 309 may be configured to redirect the second portion of the received combined upstream optical channels to a second ODN WDM 312 in the second PON. The redirected upstream optical channels may provide a broadband light signal to the second PON and may be handled by the components of the second PON to provide seed light signals to the ONU transmitters 332 of the second PON in a manner similar to the corresponding components of the first PON, and need not be the same in all of the PONs.

The process of splitting and directing a portion of the upstream optical channels or signals in the first PON to the second PON, e.g. using the first optical splitter 309 and the second optical splitter 209 coupled to the first optical splitter 309, may be repeated for a plurality of PONs, e.g. PON-3, . . . PON-N, to share the same seed light source 302 and reduce the number of PON components. Reducing the quantity of seed light sources (e.g. BLSs) in the system may also reduce power consumption. In other embodiments of the PON architecture 200 or the PON architecture 300, any of the optical circulators 206 or the optical circulators 306 may be replaced by a three decibel (3 db) coupler, which may reduce cost but increase insertion loss.

A disadvantage to the PON architecture 200 and the PON architecture 300 may be that the PONs are connected in series with respect to the seed light source 202 and with respect to each other. This series configuration may result in providing a plurality of seed light signals to the PONs that depend on the connectivity and operations in the other preceding PONs in the series. For example, PON-2, PON-3, . . . and PON-N transmitters may depend on PON-1 transmitters, and PON-N transmitters may depend on PON-1, PON-2, . . . and PON-(N−1) transmitters. For instance, the first OLT transmitter 222 and/or ONU transmitter 332 in the second PON (e.g. PON-2) may provide the seed light signals to the remaining OLT transmitters 222 and/or ONU transmitters 332 in the remaining PONs in the series (e.g. PON-3, . . . PON-N). Thus, a failure of the first OLT transmitter 222 and/or ONU transmitter 332 in the same PON may affect the output of corresponding OLT transmitters 222 and/or ONU transmitters 332 in the remaining PONs that operate at the same wavelength as the first OLT transmitter 222 and/or ONU transmitter 332. Such systemic risk may significantly impact overall system reliability in the PON architecture 200 and the PON architecture 300.

Figure 4:
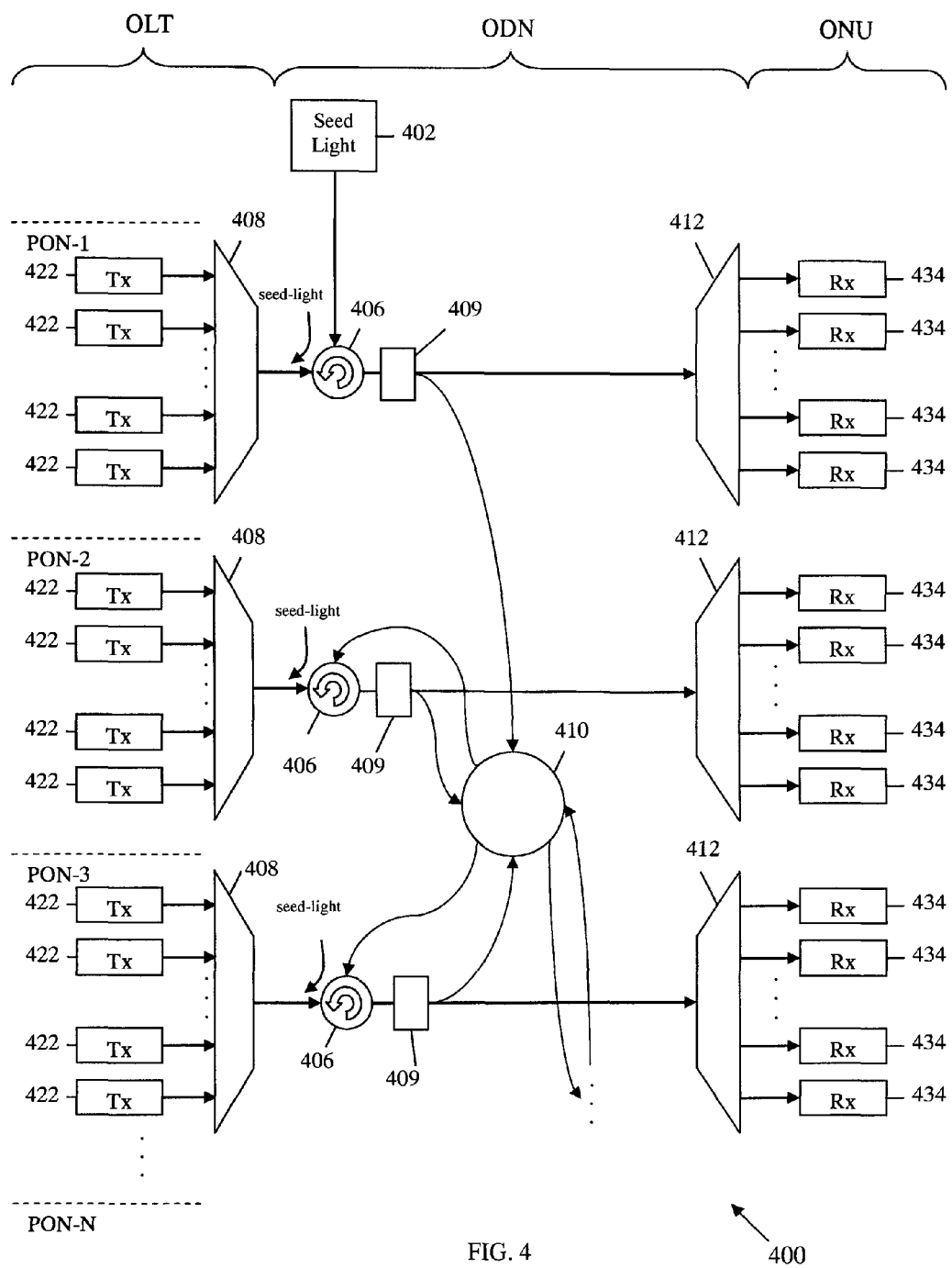
FIG. 4 is a schematic diagram of another embodiment of a PON architecture.

FIG. 4 illustrates another embodiment of a PON architecture 400 where a plurality of PONs, e.g. PON-1, PON-2, . . .

and PON-N, may share a seed light source 402 to support injection-locking to transmit a plurality of downstream optical channels (indicated by the arrows from left to right). The PON architecture 400 may comprise a plurality of OLT transmitters 422, an OLT WDM 408, an optical circulator 406, an optical splitter 409, an ODN WDM 412, and a plurality of ONU receivers 434 in each PON. Additionally, the PON architecture 400 may comprise a seed light source 402 that may be coupled to one of the PONs and a star coupler 410 that may be coupled to a plurality of PONs. The components of the PON architecture 400 may be arranged as shown in FIG. 4 and may be configured substantially similar to the corresponding components of PON architecture 200. For instance, the seed light source 402, the OLT WDM 408, the optical circulators 406, the optical splitters 409, the ODN WDM 412, or combinations thereof may be located in the ODNs or OLTs of the corresponding PONs, and need not be the same in all of the PONs. In addition, the PONs in the PON architecture 400 may be coupled in a parallel configuration, instead of arranging the PONs in series. Specifically, the star coupler 410 may be used to couple the PONs in parallel. This parallel configuration may reduce the systemic risk caused by the series configuration, as described above, and thus increase overall system reliability and robustness.

The star coupler 410 may be any device configured to receive a plurality of optical signals on a plurality of input ports and distribute the optical signals via a plurality of output ports. In an embodiment, the quantity of input ports may be equal to N and the quantity of output ports may be equal to about N−1. The ratio of input ports to output ports may be a design consideration and may vary according to different architectures or configurations. The input ports of the star coupler 410 may be coupled to an optical splitter 409 in each of the PONs. The star coupler 410 may receive, via the input ports, a plurality of seed light signals that correspond to a plurality of wavelength channels, e.g. $\lambda_1, \lambda_2, \ldots \lambda_n$. The seed light signals may be provided by the optical splitters 409 in the PONs. Specifically, each optical splitter 409 may direct a first portion (e.g. about 90 percent energy) of the downstream optical channels from the OLT transmitters 422 to the ONU receivers 434 and a second portion (e.g. about 10 percent energy) of the downstream optical channels to the star coupler 410 that may be used as seed light signals.

The star coupler 410 may distribute the seed light signals that correspond to the received downstream optical channels via the output ports to the optical circulator 406 in each PON, except the first PON (e.g. PON-1) that is coupled directly to the seed light source 402. Specifically, the star coupler 410 may direct a portion of the energy of the seed light signals for each wavelength to the optical circulator 406 in all the PONs, except the first PON. The optical circulators 406 may receive a seed light signal for each wavelength, e.g. $\lambda_1, \lambda_2, \ldots \lambda_n$, and direct the seed light signals to the OLT transmitters 422 in the same PON to provide injection-locking to the OLT transmitters 422 and enable the OLT transmitters 422 to transmit the downstream optical channels. The star coupler 410 may improve system reliability in comparison with the PON architecture 200, since a failure in an individual OLT transmitter 422 in any PON in the PON architecture 400 (except the first PON) may not affect the operation of a corresponding OLT transmitter 422 in a second PON that operates at the same wavelength. However, the star coupler 410 may add complexity and/or cost to the system.

In other embodiments, the PON architecture 400 may comprise a plurality of seed light sources 402 coupled to different PONs. For example a first PON (e.g. PON-1) may be coupled to a first seed light source 402 and a second PON (e.g. PON-N) may be coupled to a second seed light source (not shown). In such embodiments, the star coupler 410 may receive a plurality of seed light signals from separate seed light sources which may further increase system robustness and reliability. In other embodiments, one or more seed light sources 402 may be coupled directly to the star coupler 410. However, such a configuration may require a relatively high power seed light source 402, e.g. in comparison to the PON architecture 400, depending on the overall architecture and variable load requirements of the system.

Figure 5:
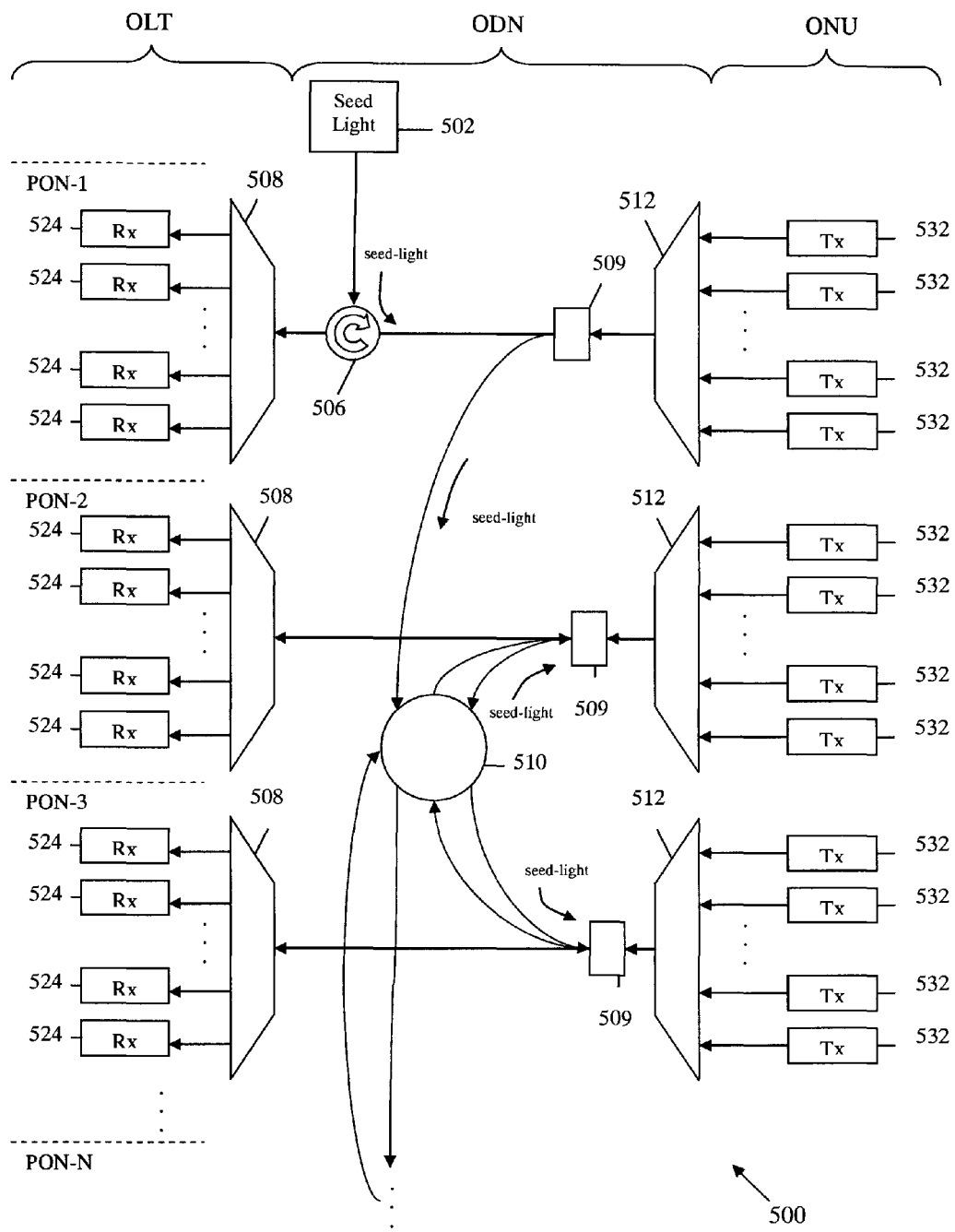
FIG. 5 is a schematic diagram of another embodiment of a PON architecture.

FIG. 5 illustrates another embodiment of a PON architecture 500, where a plurality of PONs, e.g. PON-1, PON-2, ... PON-N, may share a seed light source 502 to support injection-locking to transmit a plurality of upstream optical channels (indicated by arrows from right to left). The PON architecture 500 may comprise a plurality of OLT receivers 524, an OLT WDM 508, an optical splitter 509, an ODN WDM 512, and a plurality of ONU transmitters 532 for each PON. Additionally, the PON architecture 500 may comprise a seed light source 502 and an optical circulator 506 that may be coupled to one of the PONs, and a star coupler 510 that may be coupled to a plurality of PONs. The components of the PON architecture 500 may be arranged as shown in FIG. 5 and may be configured substantially similar to the corresponding components of the PON architecture 400. For instance, the seed light source 402, the OLT WDM 408, the optical circulators 406, the optical splitters 409, the ODN WDM 412, or combinations thereof may be located in the ODNs or OLTs of the corresponding PONs, and need not be the same in all of the PONs. In addition, the PONs in the PON architecture 500 may be coupled in a parallel configuration instead of in a series configuration, as described above, which may increase system reliability and robustness. Specifically, the star coupler 510 may be used to couple the PONs in parallel.

The star coupler 510 may be any device configured to receive on each of a plurality of N input ports a plurality of seed light signals that correspond to a plurality of wavelengths, e.g. $\lambda_1, \lambda_2, \ldots \lambda_n$. The seed light signals on each input port may correspond to a portion (e.g. about 10 percent energy) of the upstream optical channels at the same wavelengths which may be directed by the optical splitter 509 in each PON to the star coupler 510. The star coupler 510 may distribute the seed light signals in a plurality of N−1 output ports back to the optical splitter 509 in each PON, except the first PON that is coupled directly to the seed light source 502. As such, each of the output ports may be coupled to a PON via a corresponding optical splitter 509, except the first PON, e.g. PON-1. The remaining PONs, e.g. PON-2, ... and PON-N, may receive the seed light signals that may be then directed by the corresponding optical splitter 509 to the ONU transmitters 532 to provide injection-locking. As such, the ONU transmitters 532 in the PONs may receive a corresponding seed light signal regardless of whether a corresponding ONU transmitter 532 that operates at the same wavelengths in another PON fails, with the exception of the first PON's transmitters that initially provides the star coupler 510 with broadband light. For example, PON-3 may continue to receive seed light signals regardless of the connectivity state or laser failures of PON-2. In another embodiment of the PON architecture 500, the seed light source 502 may be coupled directly to the star coupler 510 and provide the star coupler 510 with the broadband light signal. As such, the PONs may receive the seed light signals from the star coupler 510 regardless of failures in any of the PONs.

All or part of the PON architectures above may be combined to provide injection-locking to transmit downstream optical channels from the OLT, upstream optical channels from the ONUs, or both. For example, the PON architecture 200 may be combined with the PON architecture 300, and the PON architecture 400 may be combined with the PON architecture 500. The seed light injected lasers used in the OLT and ONU transmitters of the PON architectures above may comprise IL FP LDs, RSOAs, and/or other types of seed light injected lasers. The types of seed light injected lasers used in the different PON architectures may be selected based on design considerations. For instance, the IL FP LDs may add relatively less noise to the transmitted signals in comparison to other types of seed light injected lasers, such as RSOAs. However, RSOAs may be less sensitive to the polarization state of the seed light signals when compared to other types of seed light injected lasers, such as IL FP LDs. Thus, using IL FP LDs in the PON architectures above may require polarization correction for the seed light signals, e.g. using polarization compensators or controllers, polarization maintaining fibers, and/or IL FP LDs that have perpendicular polarizations. In the case of the parallel PON configuration (e.g. PON architecture 400 and PON architecture 500), the seed light signals may be provided from separate IL FP LDs and/or BLSs, and thus may have different polarization states. This may reduce the polarization dependence of the seed light sources on the IL FP LDs and require less polarization correction in comparison to the PON series configuration (e.g. PON architecture 200 and PON architecture 300).

Figure 6:
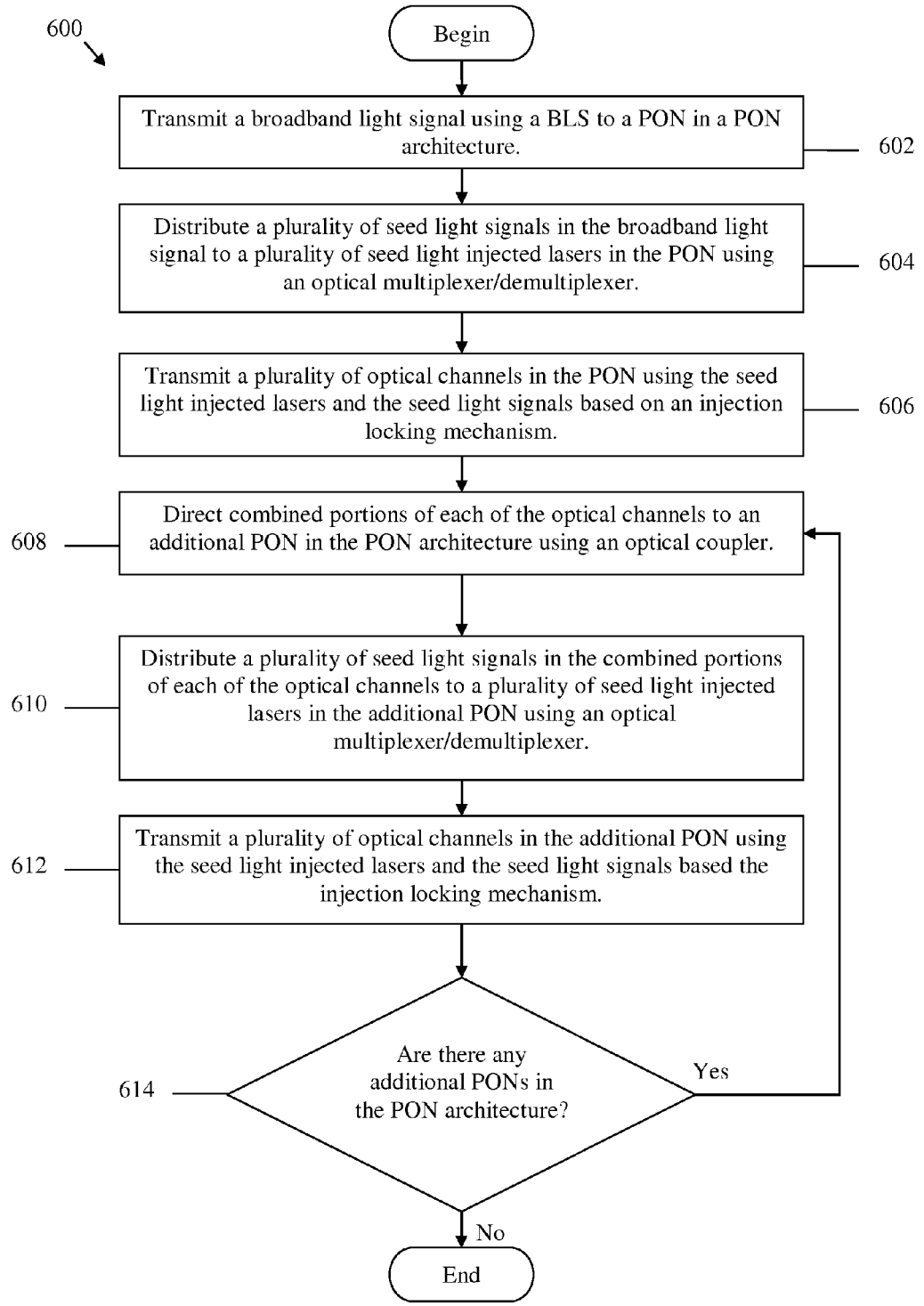
FIG. 6 is a flowchart of one embodiment of a PON injection-locking method.

FIG. 6 illustrates an embodiment of a PON injection-locking method 600 that may be used in a PON series configuration, such as the PON architecture 200 or the PON architecture 300. The method 600 may begin at block 602, where a broadband light signal may be transmitted using a BLS, e.g. seed light source 202 or seed light source 302, to a PON in the PON architecture. The broadband light signal may comprise a plurality of seed light signals that correspond to a plurality of wavelength channels and that may be used to provide injection-locking for a plurality of seed light injected lasers that operate at the corresponding wavelengths in the PON, e.g. at the OLT or the ONUs.

At block 604, a plurality of seed light signals in the broadband light signal may be distributed to a plurality of seed light injected lasers in the PON using an optical multiplexer/demultiplexer, such as an AWG. For instance, an OLT WDM may filter the broadband light signal into a plurality of seed light signals at a plurality of wavelengths or narrowband wavelength channels and send the seed light signals to the corresponding OLT transmitters. Alternatively, an ODN WDM may filter and distribute the seed light signals to a plurality of corresponding ONU transmitters.

At block 606, a plurality of optical channels may be transmitted in the PON using the seed light injected lasers and the seed light signals based on an injection-locking mechanism. For instance, the OLT transmitters may use the seed light signals to transmit a plurality of downstream optical channels. Alternatively, a plurality of ONU transmitters may use the seed light signals to transmit a plurality of upstream optical channels. At block 608, combined portions of each of the optical channels may be directed to an additional PON in the PON architecture using an optical coupler, such as an optical splitter. For instance, an optical splitter may be used to tap into the downstream or upstream optical channels and send a portion of the energy (e.g. about 10 percent) of each optical channel from a first PON (e.g. PON-1) to a second PON (e.g. PON-2).

At block 610, a plurality of seed light signals in the combined portions of each of the optical channels may be distributed to a plurality of seed light injected lasers in the additional PON using an optical multiplexer/demultiplexer (e.g. AWG). For instance, an OLT WDM may be used to filter the combined portion of the optical channels into a plurality of seed light signals that correspond to the optical wavelength channels and direct each of the seed light signals to a corresponding OLT transmitter. Alternatively, an ODN WDM may be used to filter and send the seed light signals to a plurality of corresponding ONU laser transmitters.

At block 612, a plurality of optical channels may be transmitted in the second PON using the seed light injected lasers and the seed light signals based on the injection-locking mechanism. The optical channels may correspond to a plurality of downstream optical channels from a plurality of OLT transmitters or a plurality of upstream optical channels from a plurality of ONU transmitters. At block 614, the method 600 may return to block 608 to operate the lasers in any additional PON. Otherwise, the method 600 may end.

Figure 7:
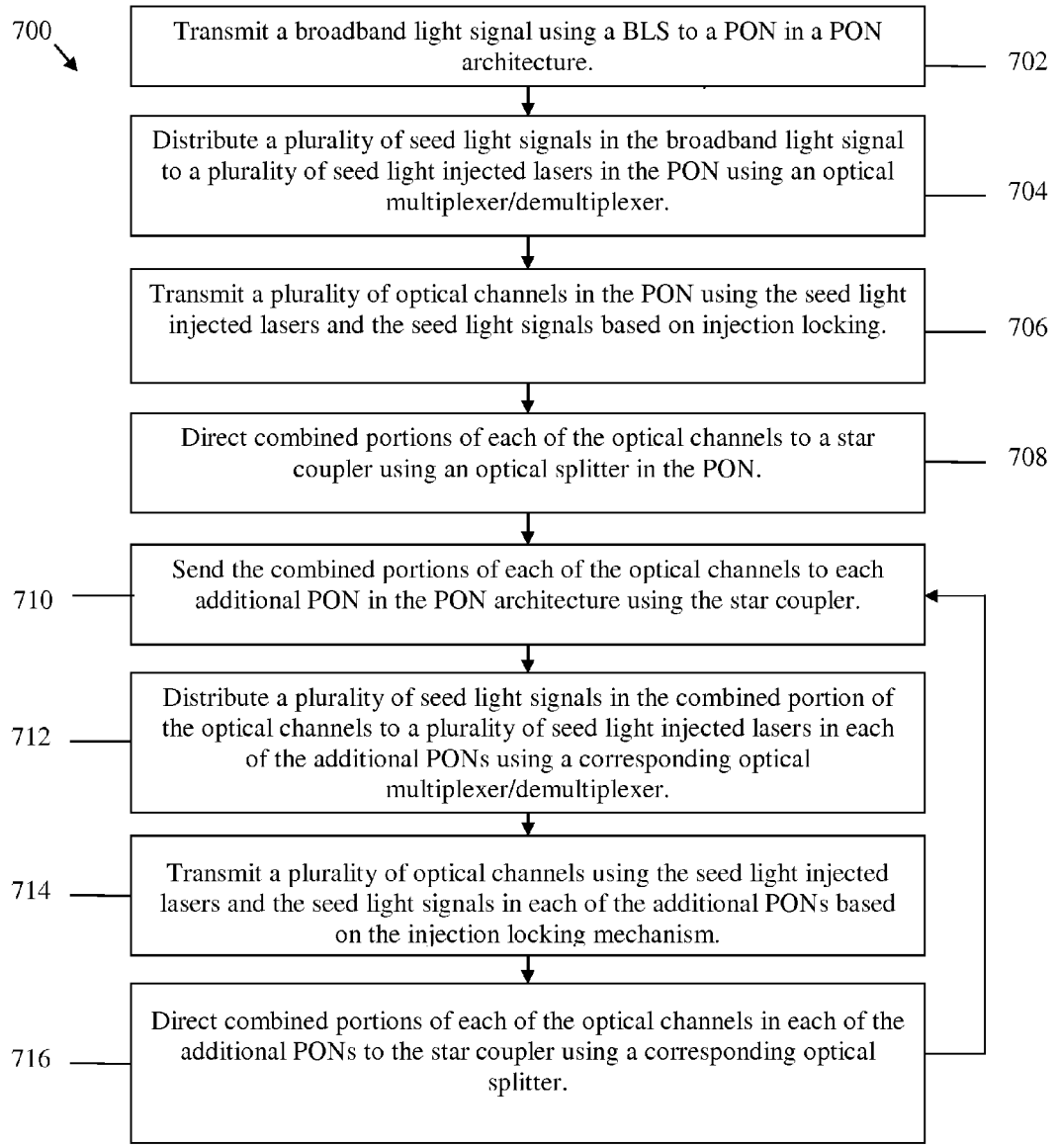
FIG. 7 is a flowchart of another embodiment of a PON injection-locking method.

FIG. 7 illustrates another embodiment of a PON injection-locking method 700, which may be used in a PON parallel configuration, such as the PON architecture 300 or the PON architecture 400. Blocks 702, 704, and 706 of the injection-locking method 700 may be substantially similar to corresponding blocks 602, 604, and 606 of the PON injection-locking method 600. At block 708 of the PON injection-locking method 700, combined portions of each of the optical channels may be directed to a star coupler using an optical splitter in a PON, which may be coupled to a plurality of PONs in the PON architecture. At block 710, the combined portions of each of the optical channels may be sent to each additional PON in the PON architecture using the star coupler, e.g. except a first PON that may be directly coupled to the BLS. For instance, the star coupler 410/510 may send the signals received from PON-1 to additional N−1 PONs, e.g. PON-2, PON-3, . . . PON-N, via corresponding output ports.

At block 712, a plurality of seed light signals in the combined portions of the optical channels may be distributed to a plurality of seed light injected lasers in each of the additional PONs using a corresponding optical multiplexer/demultiplexer. For example, in each of the N−1 PONs that receive the signals from the star coupler 410/510, an OLT WDM 408/508 or an ODN WDM 412/512 may forward the seed light signals to the corresponding OLT transmitters 422 or ONU transmitters 532 to provide injection-locking. At block 714, a plurality of optical channels may be transmitted using the seed light injected lasers and the seed light signals in each of the additional PONs based on the injection-locking mechanism. At block 716, combined portions of each of the optical channels in each of the additional PONs may be directed to the star coupler using a corresponding optical splitter. The method 700 may then return to block 710 and thus repeat the subsequent steps, e.g. in a continuous manner, to providing seed lights to each of the additional PONs.

In the method 700, the first PON (e.g. PON-1) that is coupled directly to the BLS may not receive the combined portions of optical channels from the star coupler. However, in other embodiments, the BLS may be coupled directly to the star coupler and transmit the broadband light signal to the star coupler instead of the first PON or any PON in the PON architecture. Thus, the star coupler may be used to distribute the signals to about N PONs and receive the signals from about N PONs, e.g. in a continuous manner similar to the steps in blocks 710, 712, 714, and/or 716.

Figure 8:
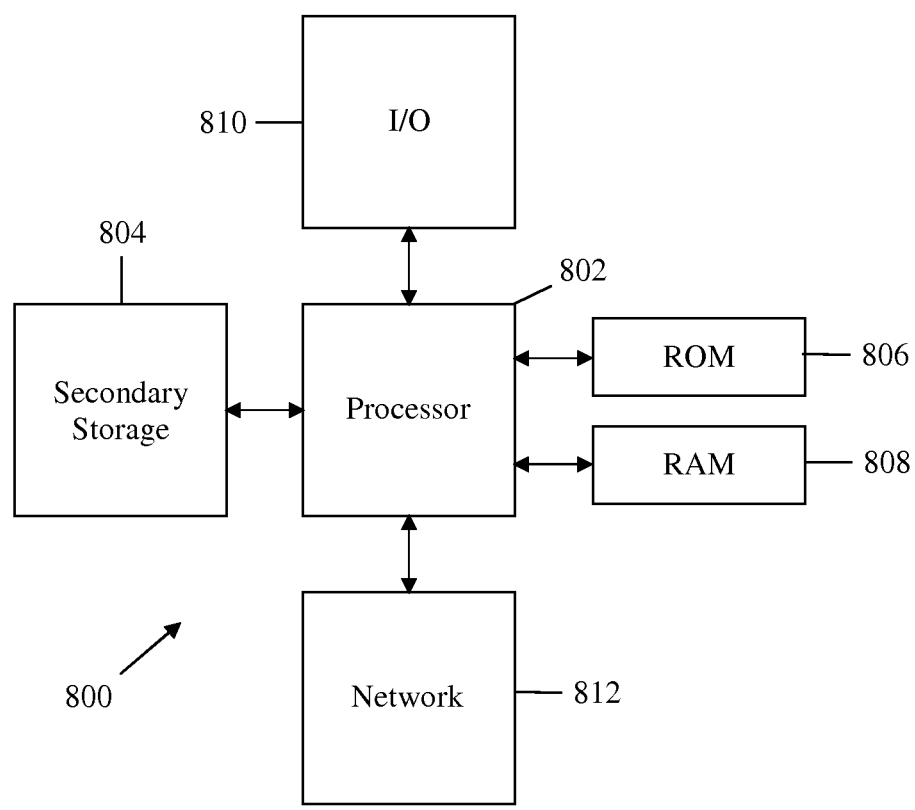
FIG. 8 is a schematic diagram of one embodiment of a general-purpose computer system.

The methods and systems described above may be implemented on any general-purpose network component, such as a computer or network component with sufficient processing power, memory resources, and network throughput capability to handle the necessary workload placed upon it. FIG. 8 illustrates a typical, general-purpose network component suitable for implementing one or more embodiments of a node disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) 810 devices, and network connectivity devices 812. The processor may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first optical transmitter configured to couple to a second optical transmitter, a first optical receiver, and a seed light source,
wherein the first optical transmitter and the first optical receiver are part of a first passive optical network (PON) and the second optical transmitter and a second optical receiver are part of a second PON,
wherein the seed light source is directly coupled to the first PON via only a first optical circulator in the first PON,
wherein the seed light source is indirectly coupled to the second PON via the first PON, and
wherein at least one of the first optical transmitter and the second optical transmitter is an injection locked laser transmitter.

2. The apparatus of claim 1, wherein the first optical transmitter is coupled to the second optical transmitter via an optical star coupler, wherein the first optical transmitter is coupled to a first input port of the optical star coupler via a first optical splitter in the first PON, and wherein the second transmitter is coupled to both a first output port and a second input port of the optical star coupler.

3. The apparatus of claim 2, wherein the first optical transmitter is located in a first optical line terminal (OLT), the second optical transmitter is located in a second OLT, the first optical receiver is located in a first optical network unit (ONU), and the second optical receiver is located in a second ONU, wherein the first optical transmitter is coupled to the seed light source via only the first optical circulator, and wherein the second optical transmitter is coupled to the first output port via only a second optical circulator in the second PON and to the second input port via only the second optical circulator and a second optical splitter in the second PON.

4. The apparatus of claim 2, wherein the first optical transmitter is located in a first optical network unit (ONU), the second optical transmitter is located in a second ONU, the first optical receiver is located in a first optical line terminal (OLT), and the second optical receiver is located in a second OLT, and wherein the second optical transmitter is coupled to the first output port and the second input port via only a second optical splitter in the second PON.

5. The apparatus of claim 1, wherein the first optical transmitter is coupled to the seed light source via only the first optical circulator, wherein the first optical transmitter is coupled to the second optical transmitter via the first optical circulator, a first optical splitter in the first PON, and a second optical circulator in the second PON, and wherein the first optical circulator is positioned between the first optical transmitter and the first optical splitter, the first optical splitter is positioned between the first optical circulator and the second optical circulator, and the second optical circulator is positioned between the first optical splitter and the second optical transmitter.

6. The apparatus of claim 5, wherein the first optical transmitter is located in a first optical line terminal (OLT), the second optical transmitter is located in a second OLT, the first optical receiver is located in a first optical network unit (ONU), and the second optical receiver is located in a second ONU.

7. The apparatus of claim 1, wherein the first optical transmitter is coupled to the second optical transmitter via only a first optical splitter in the first PON and a second optical splitter in the second PON, and wherein the first optical splitter is positioned between the first optical transmitter and the second optical splitter, and the second optical splitter is positioned between the first optical splitter and the second optical transmitter.

8. The apparatus of claim 7, wherein the first optical transmitter is located in a first optical network unit (ONU), the second optical transmitter is located in a second ONU, the first optical receiver is located in a first optical line terminal (OLT), and the second optical receiver is located in a second OLT.

9. The apparatus of claim 1, wherein both the first optical transmitter and the second optical transmitter are injection locked Fabry Perot laser diodes (IL FP LDs), and wherein the second optical transmitter is further coupled to a polarization controller configured to correct a polarization state of the first portion of the transmitted signal received from the first optical transmitter.

10. An apparatus comprising:
a seed light source;
a first passive optical network (PON) directly coupled to the seed light source via only a first optical circulator, wherein the first PON comprises a first optical line terminal (OLT) transmitter, the first optical circulator, and a plurality of first optical network units (ONU) receivers; and
a second PON indirectly coupled to the seed light source via the first PON, but not coupled to any other seed light sources, wherein the second PON comprises a second OLT transmitter and a plurality of second ONU receivers.

11. The apparatus of claim 10, wherein the first OLT transmitter and the second OLT transmitter are seed light injection locked lasers, and wherein the second PON is configured to receive a seed light signal from the first PON.

12. The apparatus of claim 11 further comprising an optical star coupler positioned between the first PON and the second PON.

13. The apparatus of claim 12, wherein the second PON is coupled to the star coupler via only an optical splitter and a second optical circulator in the second PON.

14. The apparatus of claim 11, wherein the first PON is directly coupled to the second PON via only an optical splitter in the first PON and a second optical circulator in the second PON.

15. A method comprising:
feeding a seed light to a plurality of injection locked laser transmitters in a plurality of passive optical networks (PONs) using only one broadband light source (BLS), wherein each PON comprises an optical line terminal (OLT) transmitter and a plurality of optical network units (ONUs) receivers,
wherein the BLS is directly coupled only to a first PON of the plurality of PONs via only a first optical circulator in the first PON, and
wherein the injected locked laser transmitters in each of the PONs, except the first PON, are configured to injection lock their transmitted signals to a transmitted wavelength received from a different PON.

16. The method of claim 15, wherein the injection locked laser transmitters comprise the OLT transmitters.

* * * * *

UNITED STATES PATENT AND TRADEMARK OFFICE
CERTIFICATE OF CORRECTION

PATENT NO. : 8,644,708 B2  
APPLICATION NO. : 12/901131  
DATED : February 4, 2014  
INVENTOR(S) : Ning Cheng Page 1 of 1

It is certified that error appears in the above-identified patent and that said Letters Patent is hereby corrected as shown below:

On the Title Page:  
Item (73) Assignee: Delete "Futurewei Technologies, Plano, TX (US)" and insert -- Futurewei Technologies, Inc., Plano, TX (US) --.

Signed and Sealed this  
Twenty-second Day of April, 2014

Michelle K. Lee  
*Deputy Director of the United States Patent and Trademark Office*